United States Patent [19]

Gilb

[11] Patent Number: 5,160,211
[45] Date of Patent: Nov. 3, 1992

[54] POST TO RAILING TIE

[75] Inventor: Tyrell T. Gilb, Berkeley, Calif.

[73] Assignee: Simpson Strong-Tie Company, Inc., San Leandro, Calif.

[21] Appl. No.: 612,207

[22] Filed: Nov. 13, 1990

[51] Int. Cl.$^5$ .............................................. F16B 9/00
[52] U.S. Cl. ................................ 403/231; 403/232.1; 403/403; 256/65; 52/702; 52/712; 411/461
[58] Field of Search ................ 403/232.1, 231, 403, 403/382, 205, 283, 230; 256/65, 69, 68; 52/702, 712; 411/461–465

[56] References Cited

U.S. PATENT DOCUMENTS

| | | |
|---|---|---|
| 949,075 | 2/1910 | Hulet . |
| 963,585 | 7/1910 | Kimball .............................. 403/231 |
| 974,606 | 11/1910 | Schrader ............................ 403/403 |
| 2,084,758 | 6/1937 | Anderson .......................... 403/231 |
| 2,669,497 | 2/1954 | Bailey ................................ 403/231 |
| 3,828,514 | 8/1974 | Jureit ................................. 403/230 |
| 4,359,851 | 11/1982 | Daniels ......................... 403/230 X |
| 4,414,785 | 11/1983 | Howell ....................... 403/232.1 X |
| 4,423,977 | 1/1984 | Gibb ................................ 403/232.1 |
| 4,932,173 | 6/1990 | Commins .................. 403/232.1 X |
| 4,965,980 | 10/1990 | Leavens ......................... 52/702 X |
| 5,071,280 | 12/1991 | Turner ............................ 52/702 X |

Primary Examiner—Peter M. Cuomo
Attorney, Agent, or Firm—James R. Cypher

[57] ABSTRACT

A connector for securing a wood railing to a wood post by fasteners which are in shear in relaton to all forces imposed upon the railing. The connector is a single piece sheet metal member formed in a generally triangular cross section with openings provided for the insertion of the fasteners. The connector is placed on the underside of the railing to eliminate all top nailing or driving of screws through the top side of the rail.

6 Claims, 3 Drawing Sheets

5,160,211

POST TO RAILING TIE

BACKGROUND

This invention relates a post to top railing connection including to a sheet metal connector for attaching a wood railing to the top end of a wood post.

The common method of hammering spikes or other fasteners through the top of the rail into and parallel to the end grain of the post provides little or no code or real value in uplift or lateral resistance.

Railing top nailing creates an initial, and continuing problem due to working and shrinkage, of fastener head exposure.

If fastener exposure is to be eliminated, countersinking and filling the hole with putty is required.

Other forms of attachment include toenailing from underneath the rail which often results in post splitting and requires skilled work in hammering upwardly at an angle into a light weight railing which provides little inertial resistance.

Various forms of angle clips are available, but none are known to provide uplift resistance in shear.

SUMMARY OF THE DISCLOSURE

Use of the post to railing tie of the present invention provides true permanent uplift resistance in shear instead of non-code parallel grain attachment.

Location of the post to railing tie in a semi-concealed area inherently eliminates railing top surface fastener exposure thus deleting doweling, putty, or like corrective requirements.

The post to railing tie has locator prongs and a lip which combine to provide self jigging locating on the post edges.

Slot nail attachment to the post "seats" the sheet metal connector and the nails or screw fasteners driven into the post are fully concealed.

The sheet metal connector may be used with posts or railings of any dimension.

The sheet metal connector may further be used even if a splice in the rail occurs at the post attachment.

DESCRIPTION OF THE PREFERRED EMBODIMENT

Figure 1:
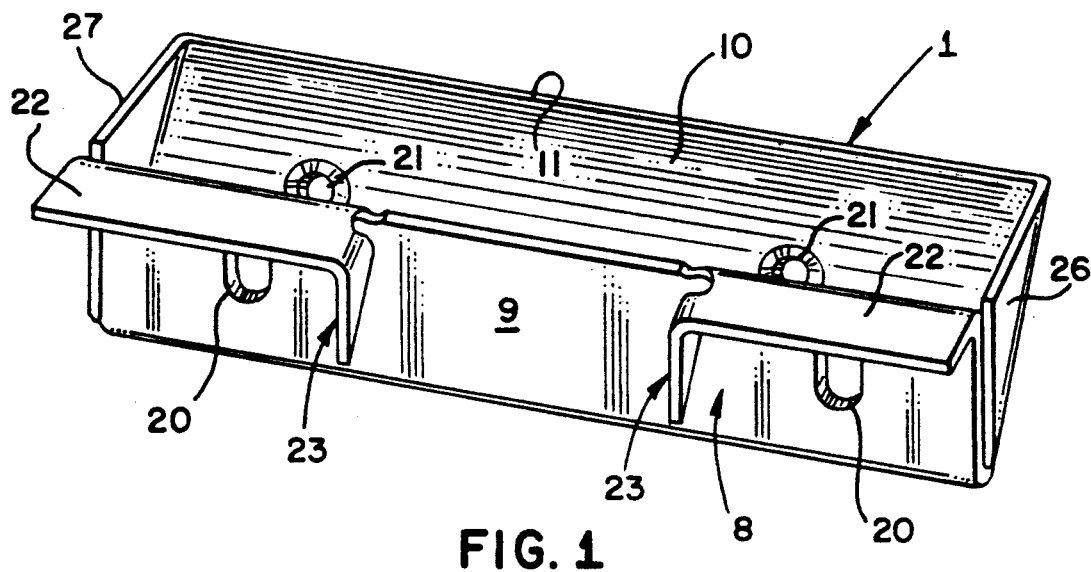
FIG. 1 is a perspective view of the sheet metal connector of the present invention.
Figure 2:
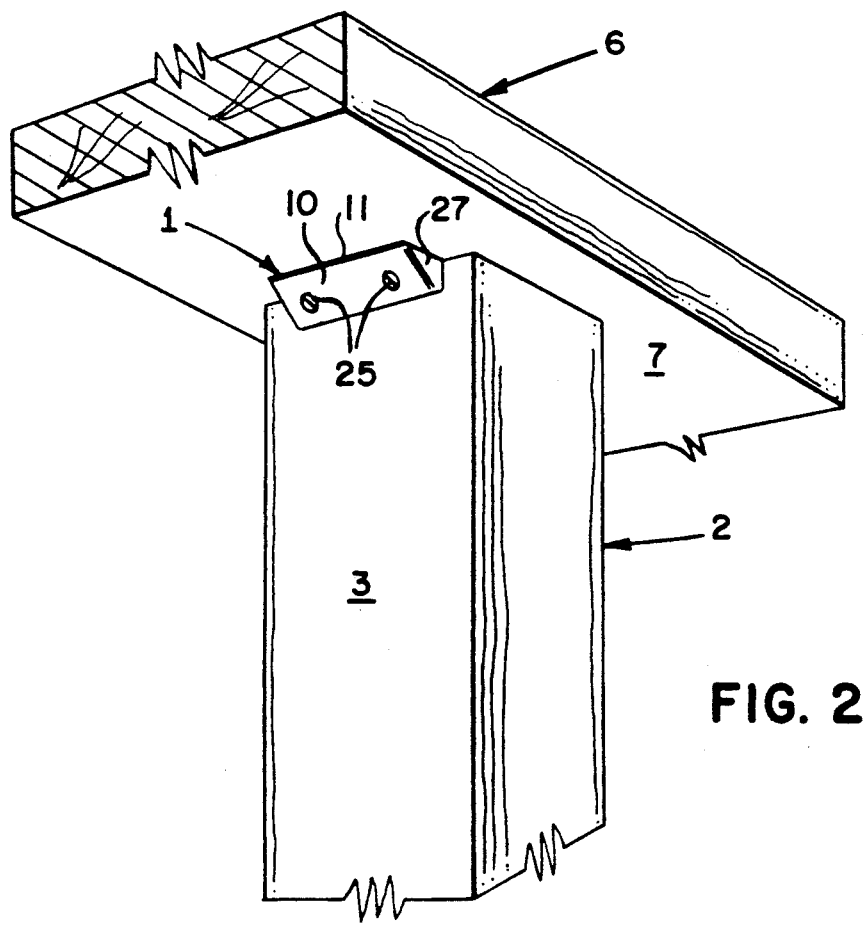
FIG. 2 is a perspective view of a typical installation of the sheet metal connector in a post to top railing connection.
Figure 3:
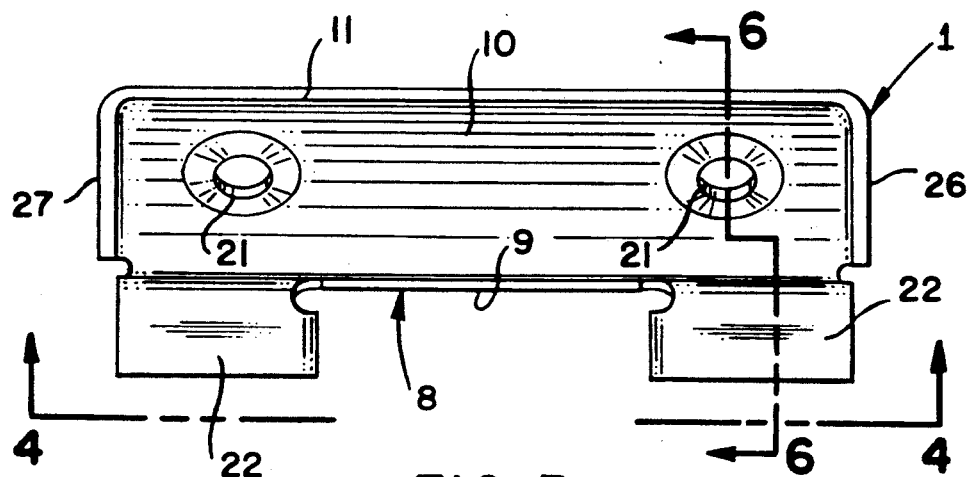
FIG. 3 is top plan view of the sheet metal connector of FIG. 1.
Figure 4:
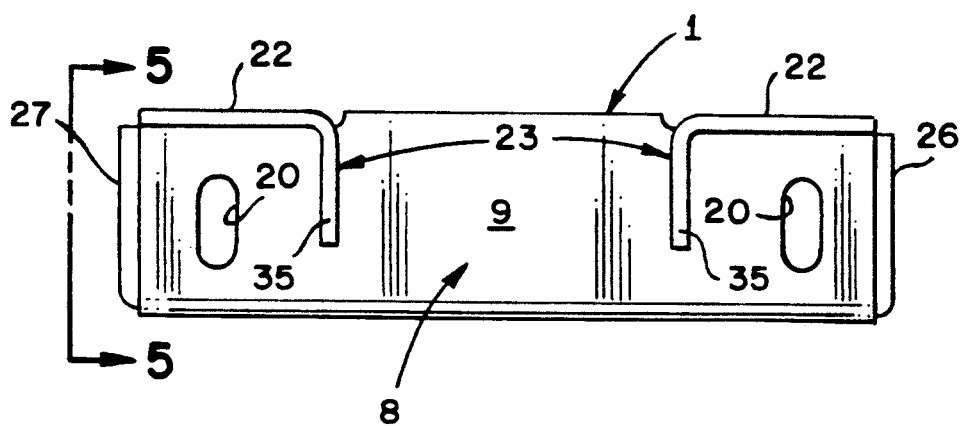
FIG. 4 is a front elevation view of the sheet metal connector taken in the direction of line 4—4 in FIG. 3.
Figure 5:
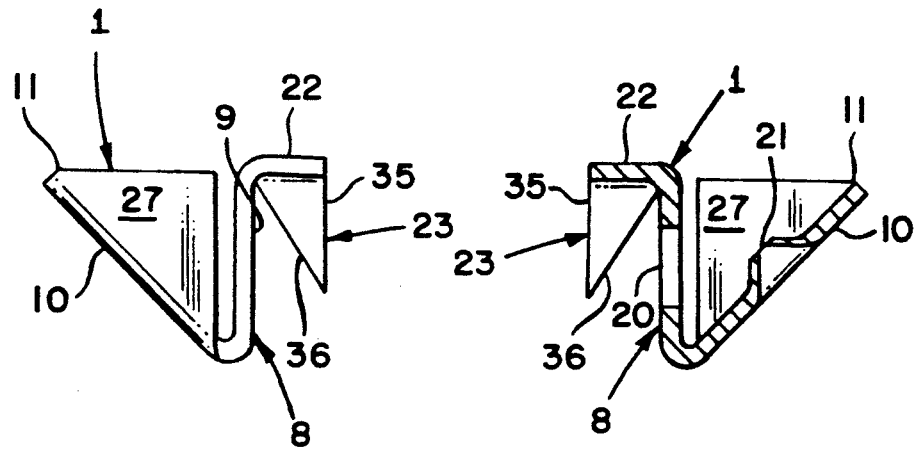
FIG. 5 is a side elevation view of the sheet metal connector taken in the direction of line 5—5 in FIG. 4.
Figure 6:
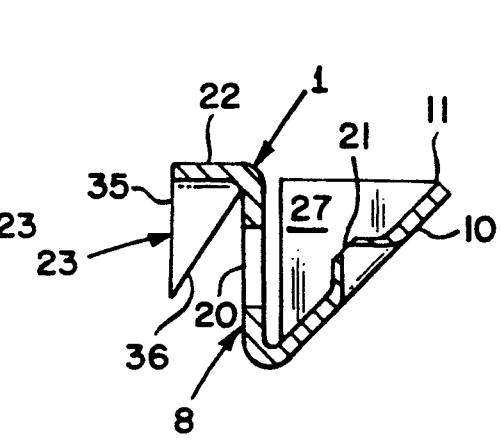
FIG. 6 is a cross sectional view of the sheet metal connector taken along line 6—6 in FIG. 3.

The present invention is a sheet metal connector 1 to provide attachment between a supporting post 2 having side faces 3 and 4 and an end face 5 and a railing 6 having a bottom face 7 in registration with the end face 5 of the supporting post 2 including: (a) a first member 8 having a portion 9 in registration with the side face 3 of the supporting post 2; (b) a second member 10 angularly connected to the first member 8 and having an edge portion 11 in registration with the bottom face 7 of the railing 6; (c) first fastener means 12 dimensioned for insertion through the first member 8 and into the supporting post 2; and (d) second fastener means 13 dimensioned for insertion through the second member 10 and into the railing 6.

Preferably, the longitudinal axis 14 of the first fastener means 12 is disposed at an angle 16 to the longitudinal axis 15 of the supporting post 2.

In another preferred form, the longitudinal axis 17 of the second fastener means 13 is disposed at an angle 18 to the longitudinal axis 19 of the railing 6.

For ease in installing the sheet metal connector 1, the first member 8 is formed with an obround opening 20 dimensioned for receiving the first fastener means 12 therethrough.

For further ease in installing the sheet metal connector 1, the second member 10 is formed with an opening 21 dimensioned for receiving the second fastener means 13 therethrough.

As a self jigging means, a lip member 22 may be connected to the first member 8 and disposed for registration with the end face 5 of the supporting post 2.

Although not essential to the sheet metal connector, to assist in installation, a locator prong 23 is formed in the lip member for insertion into the end face 5 of the supporting post 2.

Preferably in making the connection between the wood supporting post 2 having first and second side faces 3 and 4 and an end face 5 and a wood railing 6 having a bottom face 7 in registration with the end face of the supporting post, a pair of identical first and second single piece sheet metal connectors 1 and 1' are used.

The first sheet metal connector 1 includes a first member 8 having a portion in registration with the first side face 3 of the post 2 and the second sheet metal connector 1' includes a first member 8' having a portion in registration with the second side face 4 of the post 2. The first and second sheet metal connectors 1 and 1' each are formed with a second member 10 and 10' respectively angularly connected to the first members 8 and 8' and each of the second members 10 and 10' have a portion 11 and 11' in registration with the bottom face 7 of the railing 6. Each of the first members 8 and 8' is formed with a plurality of obround fastener openings 20 and 20'. Each of the second members 10 and 10' is formed with a plurality of fastener openings 21 and 21'. Each of the first members 8 and 8' is formed with a lip member 22 and 22' connected respectively thereto and disposed for registration with opposite sides of the post end face 5. Each of the lip members 22 and 22' is formed with at least one locator prong 23 for insertion into the post end face 5.

A plurality of first fastener means 12 and 12' are dimensioned for insertion through the obround fastener openings 20 in the respective first members 8 and 8' and into the post 2 and each of the first fastener means 12 are disposed at an angle 16 and 16' to the longitudinal axis 15 of the post 2.

A plurality of second fastener means 13 and 13' are dimensioned for insertion through the openings 21 and 21' in the respective second members 10 and 10' and into the railing 6 and each of the second fastener means 13 and 13' are disposed at an angle 18 and 18' to the longitudinal axis 19 of the railing 6.

Installation of sheet metal connectors 1 and 1' is as follows. First, the sheet metal connector 1 is centered on one side of post 2 and locator prongs 23 are driven into end face 5 of post 2 by tapping on lip member 22 lightly with a hammer (not shown). Second, the sheet metal connector 1 is secured to post 2 by inserting two No. 8×1¼" screws through obround openings 20 into a side face 3 of post 2. The above steps are then repeated to fasten a second sheet metal connector 1' on the opposite side 4 of post 2. Finally, a 2×4 or 2×6 railing 6 is positioned on top of post 2 and fastened with four No. 8×1¼" galvanized wood screws through openings 21 in second member 10.

The installation described above has no surface nailing in the upper side 24 of railing 6. Thus there are no hammer marks in the upper surface of the railing 6 caused by inexpert craftsmen and there are no nail heads to catch on the hands of persons using the railing. Top nailed railings work loose and the nail heads rise above the railing top surface 24. This result is eliminated with the present invention. Further, there are no hammer depressions to collect water or nail heads to rust in the upper visible surface 24 of railing 6.

Preferably flat head screws should be used with the connector described, but galvanized nails of the proper lengths may also be used.

It should be noted that the sheet metal connector above described may also be used where a splice occurs in the railing so long as the screws fall on either side of the splice.

The sheet metal connector may be made from 18 ga. galvanized steel on a progressive die using a 3¼" coil. Weight of a single sheet metal connector is approximately 0.085 pounds. The sheet metal connector when formed is approximately 2½" wide, 1¼" wide and has a depth of about 9/16".

Figure 7:
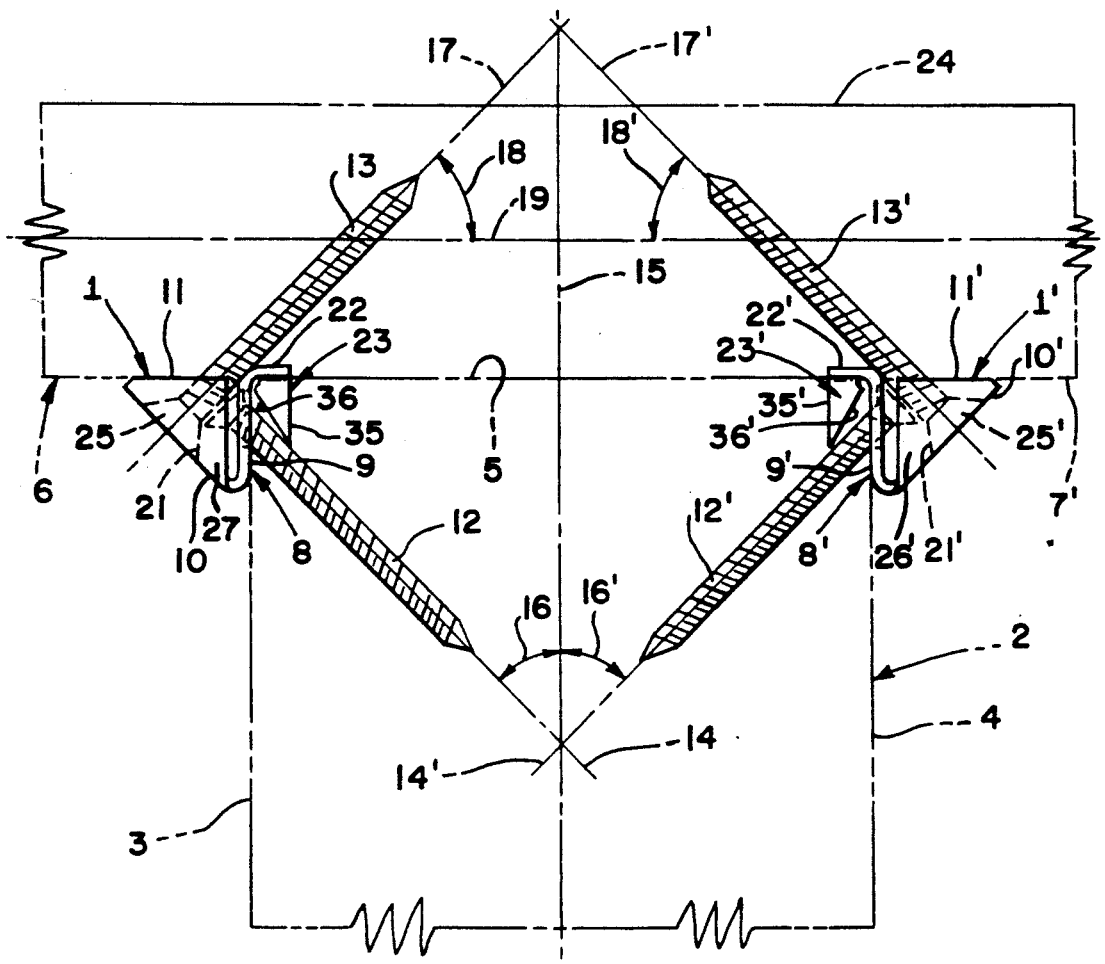
FIG. 7 is a side view of two sheet metal connectors in a typical installation of the post to top railing connection as illustrated in FIG. 2. The railing and post are shown in phantom line illustrating their positions with respect to the sheet metal connector.
Figure 8:
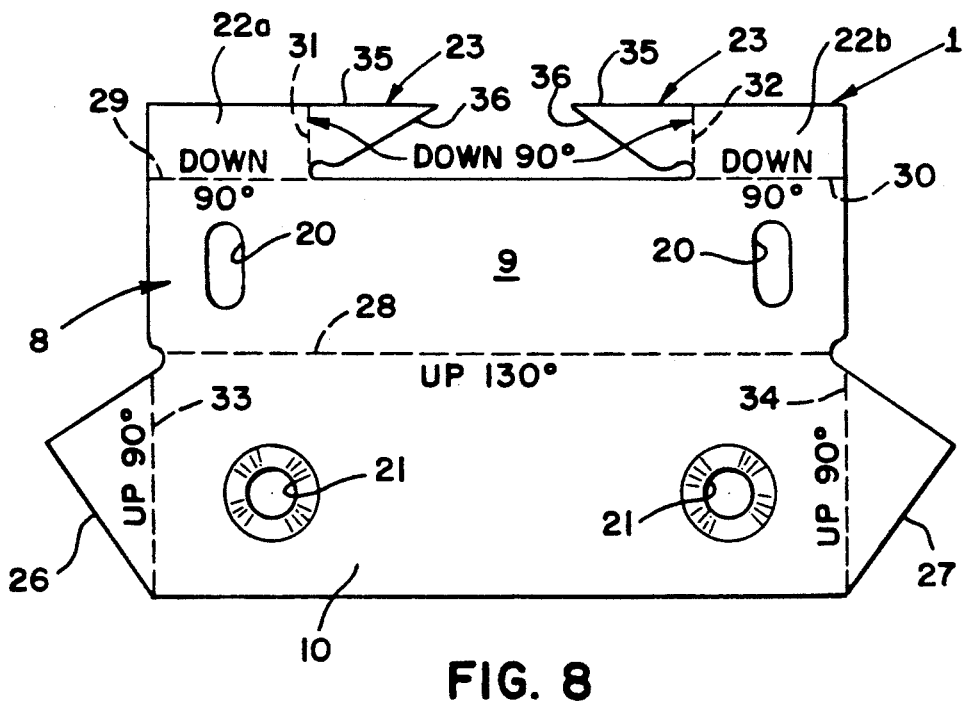
FIG. 8 is a top plan view of the blank of the sheet metal connector of the present invention prior to bending.

As shown in FIG. 7 of the drawings, the fasteners 12 and 13 are in shear in respect to a force in any direction upon the railing 6 which provides for the greatest resistance. Essentially, all of the fasteners are at about a 45° angle to the centerlines of either the railing or the post.

To provide a neater appearance and to stiffen second member 10, openings 21 should be drawn so as to countersink the heads 25 and 25' of screw fasteners 13 and 13'.

To conceal the fasteners and to further stiffen second member 20, triangular members 26 and 27 are formed at the ends of second member 20 and bent at a 90° angle.

Construction of the sheet metal connector may be effected by reference to the blank shown in the drawings. First member 8 is bent up 130° along bend line 28. Lip 22a is then bent down 90° along bend line 29 and lip 22b is bent down 90° along bend line 30. Prongs 23 are then bent down 90° along bend lines 31 and 32. Finally, triangular members 26 and 27 are bent up 90° along bend lines 33 and 34.

For best results, 1st member 8 of the sheet metal connector 1 should be as close to the side face 4 of the post 2 as possible. To assist the installer, the locator prongs 23 are formed so that when installed, the forward edge 35 of the locator prong 23 is generally parallel to the side 3 of post 2 and the inner edge 36 of the locator prong 23 is angled toward the post. Thus as the sheet metal connector is driven downwardly into the end face 5 of post 2, the first member 8 of the sheet metal connector 1 is drawn closely to the side face 3 of the post 2.

It should also be noted that the fastener openings 20 and 21 are located closely adjacent to one another so that when screw fasteners 12 and 13 are driven into the post and railing respectively, their is a minimum of moment arm distance between the fasteners so that the connection will be as strong as possible.

I claim:

1. A post to top railing connection comprising:
   a. a wood supporting post having a side face and an end face;
   b. a top wood railing having a bottom face in registration with said end face of said wood supporting post;
   c. a sheet metal connector including:
      (1) a first member having a portion in registration with said side face of said supporting post;
      (2) a second member having a base portion acutely angularly connected to said first member along a bend line disposed in close proximity to said side face of said post and having an edge portion in registration with said bottom face of said top wood railing, and said base portion of said second member is angularly disposed to said bottom face of said top wood railing and said side face of said supporting post;
      (3) said portion of said first member is located entirely between said bottom face of said top wood railing and said bend line of said base portion of said second member;
   d. a first fastener member having a shank dimensioned for insertion through said first member and into said wood supporting post at an acute angle to said side face of said wood supporting post and a head engaging said first member;
   e. a second fastener member having a shank dimensioned for insertion through said second member and into said top wood railing at an acute angle to said bottom face of said top wood railing and in a plane generally parallel and in close relation to a plane of said first fastener member and a head dimensioned for engaging said second member;
   f. a third fastener member spaced from said first fastener member having a shank dimensioned for insertion through said first member and into said supporting post and a head engaging said first member;
   g. a fourth fastener member spaced from said second fastener member having a shank dimensioned for insertion through said second member and into said top wood railing and a head dimensioned for engaging said second member;
   h. said heads of said first and second fastener members are in close proximity; and
   i. said heads of said third and fourth fastener members are in close proximity.

2. A post to railing connection as described in claim 1 comprising:
   a. said first member is formed with an obround opening dimensioned for receiving said shank of said first fastener member therethrough.

3. A post to railing connection as described in claim 2 comprising:
   a. said second member is formed with an opening dimensioned for receiving said shank of said second fastener member therethrough.

4. A post to top railing connection as described in claim 3 comprising:
   a. a lip member connected to said first member disposed for registration with said end face of said wood supporting post.

5. A post to top railing connection comprising:
   a. a wood supporting post having a side face and an end face;
   b. a top wood railing having a bottom face in registration with said end face of said wood supporting post;
   c. a sheet metal connector including:
      (1) a first member having a portion in registration with said side face of said supporting post;
      (2) a second member having a base portion acutely angularly connected to said first member along a bend line disposed in close proximity to said side face of said post and having an edge portion in registration with said bottom face of said top wood railing, and said base portion of said second member is angularly disposed to said bottom face of said top wood railing and said side face of said supporting post;
   d. a first fastener member having a shank dimensioned for insertion through said first member and into said wood supporting post at an acute angle to said side face of said wood supporting post and a head engaging said first member;
   e. a second fastener member having a shank dimensioned for insertion through said second member and into said top wood railing at an acute angle to said bottom face of said top wood railing and in a plane generally parallel and in close relation to a plane of said first fastener member and a head dimensioned for engaging said second member;
   f. a third fastener member spaced from said first fastener member having a shank dimensioned for insertion through said first member and into said supporting post and a head engaging said first member;
   g. a fourth fastener member spaced from said second fastener member having a shank dimensioned for insertion through said second member and into said top wood railing and a head dimensioned for engaging said second member;
   h. said heads of said first and second fastener members are in close proximity;
   i. said heads of said third and fourth fastener members are in close proximity;
   j. said first member is formed with an obround opening dimensioned for receiving said shank of said first fastener member therethrough;
   k. said second member is formed with an opening dimensioned for receiving said shank of said second fastener member therethrough;
   l. a lip member connected to said first member disposed for registration with said end face of said wood supporting post; and
   m. a locator prong formed in said lip member for insertion into said end face of said wood supporting post.

6. A post to railing connection comprising:
   a. a wood supporting post having a first and second side face and an end face;
   b. a top wood railing having a bottom face in registration with said end face of said supporting post;
   c. a pair of identical first and second single piece sheet metal connectors wherein:
      (1) said first connector includes a first member having a portion in registration with said first side face of said wood supporting post and said second connector includes a first member having a portion in registration with said second side face of said wood supporting post;
      (2) said first and second connectors are each formed with a second member respectively having a base portion acutely angularly connected to said first members and each of said second members have an edge portion in registration with said bottom face of said top wood railing and said base portion of said second member is angularly disposed to said bottom face of said top wood railing and said side face of said wood supporting post;
      (3) each of said first members is formed with a plurality of obround fastener openings;
      (4) each of said second members is formed with a plurality of fastener openings;
      (5) each of said first members is formed with a lip member connected respectively thereto disposed for registration with opposite sides of said wood supporting post end face;
      (6) each of said lip members is formed with at least one locator prong for insertion into said post end face;
   d. a plurality of first fastener means having a shank dimensioned for insertion through said obround fastener openings in said respective first members and into said wood supporting post and wherein each of said first fastener means are disposed at an acute angle to the longitudinal axis of said post and each have a head engaging said respective first members; and
   e. a plurality of second fastener means each having a shank dimensioned for insertion through said openings in said respective second members and into said railing and wherein each of said second fastener means are disposed at an acute angle to the longitudinal axis of said railing and each have a head engaging said respective second members; and
   f. said heads of said first and second fastener means are in close proximity.

* * * * *